US007199191B2

(12) United States Patent
Johnson et al.

(10) Patent No.: US 7,199,191 B2
(45) Date of Patent: Apr. 3, 2007

(54) IMPACT MODIFIER COMPOSITIONS WITH IMPROVED FLOWABILITY

(75) Inventors: Gregory Earl Johnson, Baton Rouge, LA (US); Shrikant V. Dhodapkar, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 264 days.

(21) Appl. No.: 10/795,103

(22) Filed: Mar. 5, 2004

(65) Prior Publication Data

US 2004/0236023 A1 Nov. 25, 2004

Related U.S. Application Data

(60) Provisional application No. 60/454,876, filed on Mar. 14, 2003.

(51) Int. Cl.
C08L 9/00 (2006.01)
C08L 23/00 (2006.01)
C08L 27/04 (2006.01)
C08L 33/14 (2006.01)
C08L 37/00 (2006.01)
C08L 11/00 (2006.01)
C08L 27/06 (2006.01)
C08L 27/08 (2006.01)

(52) U.S. Cl. .................. 525/206; 525/210; 525/213; 525/214; 525/215; 525/221; 525/232; 525/239; 525/240

(58) Field of Classification Search ............. 525/202, 525/206, 207, 210, 213, 214, 215, 221, 222, 525/232, 239, 241
See application file for complete search history.

(56) References Cited

U.S. PATENT DOCUMENTS

| | | | |
|---|---|---|---|
| 2,854,425 A | 9/1958 | Boger et al. | |
| 3,513,227 A | 5/1970 | De Coene et al. | |
| 3,528,841 A | 9/1970 | Donaldson et al. | |
| 3,634,385 A | 1/1972 | Walles et al. | |
| 3,682,857 A * | 8/1972 | Harris et al. | 525/83 |
| 3,819,763 A * | 6/1974 | Akane et al. | 525/75 |
| 4,263,200 A | 4/1981 | Busch et al. | |
| 4,433,105 A * | 2/1984 | Matsuda et al. | 525/211 |
| 4,440,925 A | 4/1984 | Ohorodnik et al. | |
| 4,562,224 A | 12/1985 | Busch et al. | |
| 5,446,064 A * | 8/1995 | Hori et al. | 524/536 |
| 5,695,881 A | 12/1997 | Henderson et al. | |
| 5,728,772 A * | 3/1998 | Hori et al. | 525/92 B |

FOREIGN PATENT DOCUMENTS

| | | |
|---|---|---|
| EP | 0 100 434 A2 | 2/1984 |
| EP | 0 100 434 B1 | 2/1984 |
| EP | 0 410 914 A1 | 1/1991 |
| WO | WO 83/03421 | 10/1983 |
| WO | WO 01/12716 A2 | 2/2001 |

OTHER PUBLICATIONS

Brian Kaye, Mixing of Powders, Handbook of Powder Science & Technology, Second Edition, 1997, pp. 568-585, Chapman & Hall, New York, NY.
Wolfgang Pietsch, Size Enlargement by Agglomeration, Handbook of Powder Science & Technology, Second Edition, 1997, pp. 202 & 246, Chapman & Hall, New York, NY.
C. N. Burnell and R. H. Parry, New Chlorinated Polyethylene, Rubber Age, 1968, pp. 47-56.
Mikell Knights, Mastering Micropellets: A Processing Primer, Plastics Technology, 1995, pp. 55-57.
Edward J. Griffith, Introduction, The Classes Of Cake Formation, Flow Conditioners, Cake Formation In Particulate Systems, 1991, pp. 1, 15-21, 132-133, VCH Publishers, Inc., New York, NY.
J. C. Williams, A. H. Birks and D. Bhattacharya, The Direct Measurement Of The Failure Function Of A Cohesive Powder, Powder Technology, 1970/71, pp. 328-337, vol. 4, School of Powder Technology, University of Bradford, Yorks, Great Britain.
Larry Vande Griend and Alex M. Henderson, Bulk Flow Of Ethylene-Vinyle Acetate Copolymers, Adhesives Age, 1998, pp. 14-16, 19-20, 22, 24.
Maged G. Botros, Factors Affecting Antiblock Performance Of Ethylene Vinyl Acetate Copolymers, Journal of Plastic Film & Sheeting, 1995, pp. 326-337, vol. 11.
Jurgen Runge, The Time Consolidation Of Bulk Solids On The Example Of Viscoelastic Granules, Chemical Engineering Communications, 1998, pp. 1-9, Martin-Luther University of Halle-Wittenberg, Department Of Process Engineering.
Chemical Abstract—Eric A. Eastwood, Mark D. Dadmun, Naser Pourahmady, Carole Lepilleur, Compatibilization Of Blends Containing Poly(Vinyl Chloride) And A Polyolefin Elastomer By Blocky Chlorinated Polyethylenes, Polymer Preprints, 2001, pp. 850-851, vol. 42 (2), American Chemical Society.
Chemical Abstract—Naser Pourahmady, Carole Lepilleur, Robert Detterman, Arthur Backman, A Multiblock Copolymer Compatibilizer For PVC/Polyolefin Blends, Polymers & Polymer Composites, 2000, pp. 563-566, vol. 8 (8), Rapra Technology Ltd.
Chemical Abstract—M. Y. Boluk, H. P. Schreiber, Interfacial Interactions And Mechanical Properties Of Filled Polymers, J. Appl. Polym. Sci., 1990, pp. 1783-94, vol. 40 (9-10).
Derwent Abstract—Belgium Patent Application BE815269A, published Nov. 20, 1974.
Derwent Abstract—Canadian Patent Application CA812869A, published Aug. 31, 1993.
Derwent Abstract—East Germany Patent Application DD104002A, published Feb. 20, 1974.
Derwent Abstract—German Patent Application DE2545914A, published Apr. 29, 1976.

(Continued)

Primary Examiner—Nathan M. Nutter

(57) ABSTRACT

Physical blends of solid particulates of chlorinated polyolefins and elastomeric ethylene copolymers yield a blended product with anti-blocking characteristics superior to that defined by the weight proportion-based linear interpolation of either blend component. The blend compositions are useful as impact modifiers for polyvinyl chloride compositions.

13 Claims, 13 Drawing Sheets

OTHER PUBLICATIONS

Derwent Abstract—German Patent Application DE3213687A; published Oct. 27, 1983.
Derwent Abstract—Japanese Patent Application JP05043708A, published Feb. 23, 1993.
Derwent Abstract—Japanese Patent Application JP08034019A, published Feb. 6, 1996.
Derwent Abstract—Japanese Patent Application JP59019134A, published Jan. 31, 1984.
Derwent Abstract—Japanese Patent Application JP66014662B, published Aug. 31, 1993.
Derwent Abstract—Japanese Patent Application JP95081010 B2, published Aug. 30, 1995.

* cited by examiner

IMPACT MODIFIER COMPOSITIONS WITH IMPROVED FLOWABILITY

FIELD OF THE INVENTION

This invention relates to physical blends of elastomeric ethylene copolymers and chlorinated polyolefins with improved bulk flowability.

BACKGROUND OF THE INVENTION

Chlorinated polyolefins have been widely used as impact modifiers in polyvinyl chloride (PVC) compositions to form a composition that is less prone to failure on impact. For example in U.S. Pat. Nos. 3,006,889 and 3,209,055, the use of a broad range of chlorinated and chlorosulfonated polyethylenes in blends with PVC is disclosed. Elastomeric ethylene copolymers such as ethylene/alpha-olefin copolymers also have been used as impact modifiers. For example, in U.S. Pat. No. 5,925,703 Betso et al. teach the use of linear ethylene/alpha-olefins to improve impact performance of filled thermoplastic compositions, including polyvinyl chlorides. More recently, impact modifiers that are mixtures containing chlorinated polyethylenes and elastomeric ethylene copolymers have been taught. For example, U.S. Patent Applications 2003005040, 2003014442 and 2003015368 teach improved impact resistance PVC compositions comprising impact modifier blends of randomly chlorinated polyethylene and polyolefin elastomers. Also in U.S. Pat. No. 6,124,406 Cinadr et al. teach that blocky chlorinated polyethylenes can be used to compatibilize polyolefin elastomers and PVC to give a PVC composition with improved impact resistance.

Chlorinated polymers and polyolefin elastomers, as used in the previously mentioned applications are typically in the form of particulate solids. The use of these materials requires consideration of the solid handling aspects such as packaging, transporting, storing, and unpackaging these particulate solids. When handled as individual components, both chlorinated polyolefins and polyolefin elastomers exhibit varying degrees of particle agglomeration, also known as blocking, massing, or caking. These agglomerated products are undesirable. Extended warehouse storage or shipping time, especially during warm weather months, can exacerbate product massing issues. Botros noted that material handling problems for tacky ethylene vinyl acetate pellets become more severe at elevated temperatures during summer months and in large shipments where the pressure on pellets increases in *Factors Affecting Antiblock Performance of Ethylene Vinyl Acetate Copolymers*, Journal of Plastic Film and Sheeting, Vol. 11, pp 326–337 (1995).

As pointed out by Griffith in *Cake Formation in Particulate Systems*, VCH Publishing, 1991, "any industry producing powdered solids . . . cannot consider their products as Quality Products if those products arrive at the customer's home, plant, or worksite caked and lumped to the degree that the product is not ready for immediate use." Agglomerated solids can cause such issues as interrupted schedules, scrapped or reworked product, and customer aggravation.

Numerous mechanisms can potentially cause particle agglomeration or caking. Griffith divided caking mechanisms into four major classes—electrical, chemical, mechanical, and plastic flow. Electrical behaviors that contribute to caking include static electricity and electrical interactions from crystalline structures. Chemical behaviors such as hydration and crystallization can also cause caking. Mechanical caking can be caused by particle entanglement. Plastic flow caking occurs when amorphous or soft crystalline substances merge after being subjected to either pressure or increased temperature. In the most severe case, the particles can flow together and form a single mass.

Griffith teaches that flow conditioners or anti-cake agents can be added to prevent particle agglomeration. One class of these is derived from organics such as amines, alcohols, acids, or salts. These materials form a barrier around particles and exhibit surfactant or lubricating effects. Another example of an organic anti-cake agent is disclosed in Japanese Granted Patent No. 90049207, wherein a polyoxyethylene surfactant was used to prevent blocking of chlorosulfonated polyethylene chips.

Fine-powdered solids that form physical barriers around particles can also be used as anti-cake agents. Examples include fumed silica, clays, talc, magnesium carbonate and polyethylene powders. In European Granted Patent No. 100434, Bohm et al. incorporated an anti-cake agent such as carbon black or finely divided phenolic resin, to prevent agglomeration of unvulcanized rubber particles such as alpha-olefins and chlorinated elastomers. In European Patent Application 410914, McCoskey et. al. generated pourable particles from normally tacky plastics by contacting the polymer melt with a cooling fluid containing a non-sticky material and subsequently re-contacting the plastic particles with a second non-sticky material. McCoskey showed improvement in caking behavior of propylene polymers by adding polyethylene powder to both the pellet water and to the finished polymer. Polyethylene powders having an average particle size of less than 10 microns have also been used as an anti-caking agent for vinyl acetate pellets in U.S. Pat. No. 3,258,841.

A combination of antiblocking agents such as organic dispersants and solid additives have been used to prevent agglomeration during chlorinated polyethylene manufacturing. For example, in U.S. Pat. No. 4,562,224 Busch et al. teach a process to produce chlorinated polyethylene in which poly-N-vinyl pyrrolidone and silica are present in the dispersant during the chlorination process. In PCT Application WO 01/12716, McMichael et al. teach a process of heat treating ethylene copolymer pellets and applying a talc anti-cake agent and a siloxane binding agent to generate substantially free-flowing pellets.

SUMMARY OF THE INVENTION

Surprisingly, we have found that physical blends of solid particulates of chlorinated polyolefins and elastomeric ethylene copolymers yield a blended product with anti-blocking characteristics superior to that defined by the weight proportion-based linear interpolation of either blend component. The blend compositions are useful as impact modifiers for polyvinyl chloride compositions.

DETAILED DESCRIPTION OF THE INVENTION

Figure 1:
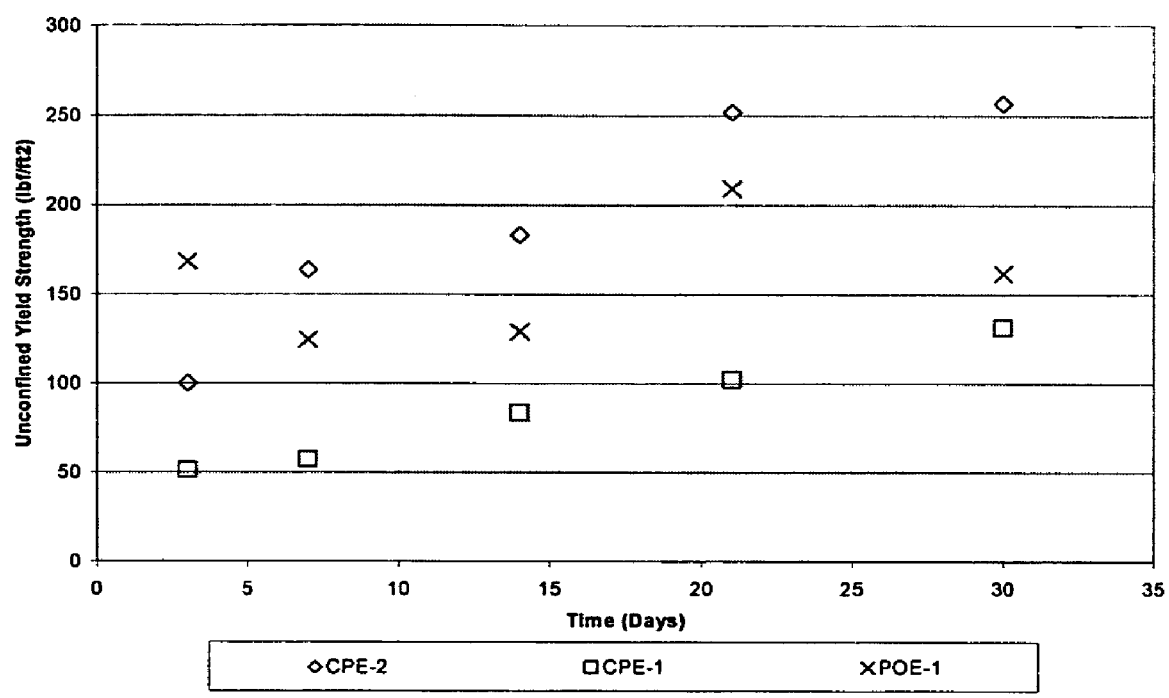
FIG. 1 illustrates the unconfined yield strength of individual components of the inventive blend as a function of time.

The blends of the present invention comprise a chlorinated polyolefin and an elastomeric ethylene copolymer. Additionally, combinations of chlorinated polyolefins or combinations of elastomeric ethylene copolymers may be used to adjust overall blend rheological properties.

The chlorinated polyolefin component of the compositions of the invention is selected from the group consisting of a) chlorinated polyethylene homopolymers and b) chlorinated copolymers prepared from polyolefins that contain copolymerized units of i) ethylene and ii) a copolymerizable monomer. The chlorinated olefin polymer may optionally include chlorosulfonyl groups. That is, the polymer chain will have pendant chlorine groups and chlorosulfonyl groups. Such polymers are known as chlorosulfonated olefin polymers.

Representative chlorinated olefin polymers include a) chlorinated and chlorosulfonated homopolymers of ethylene and b) chlorinated and chlorosulfonated copolymers of ethylene and at least one ethylenically unsaturated monomer selected from the group consisting of $C_3$–$C_{10}$ alpha monoolefins; $C_1$–$C_{12}$ alkyl esters of $C_3$–$C_{20}$ monocarboxylic acids; unsaturated $C_3$–$C_{20}$ mono- or dicarboxylic acids; anhydrides of unsaturated $C_4$–$C_8$ dicarboxylic acids; and vinyl esters of saturated $C_2$–$C_{18}$ carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Preferred chlorinated olefin polymers are chlorinated polyethylene and chlorinated copolymers of ethylene vinyl acetate.

The chlorinated olefin polymers and chlorosulfonated olefin polymers suitable for use in the impact resistant compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363, 3,296,222, 3,299,014, and 5,242,987.

Elastomeric ethylene copolymers such as ethylene/alpha-olefin copolymers are copolymers of ethylene with at least one $C_3$–$C_8$ alpha-olefin (preferably an aliphatic alpha-olefin) comonomer, and optionally, a polyene comonomer, e.g., a conjugated diene, a nonconjugated diene, a triene, etc. Examples of the $C_3$–$C_8$ alpha-olefins include propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidene-5-norbornene, 2-ethylidene-3-isopropylidene-5-norbornene, 2-propenyl-2,5- norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3, 1,2-dimethylbutadiene-1,3, 1,4-dimethylbutadiene-1,3,1-ethylbutadiene-1,3,2-phenylbutadiene-1,3, hexadiene-1,3,4-methylpentadiene-1,3, 1,3-pentadiene ($CH_3CH=CH-CH=CH_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary copolymers include ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components can include minor amounts, e.g. 0.05–0.5 percent by weight, of long chain branch enhancers, such as 2,5-norbornadiene (aka bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

The elastomeric ethylene copolymer components of this invention can be produced using any conventional olefin polymerization technology known in the art. For example, polymerization may be accomplished at conditions well known in the art for Ziegler-Natta or Kaminsky-Sinn type polymerization reactions. The elastomeric ethylene copolymer components of this invention may also be made using a mono- or bis-cyclopentadienyl, indenyl, or fluorenyl transition metal (preferably Group 4) catalysts, constrained geometry catalysts, or metallocene catalysts. Metallocene catalysts and polymerization processes using these catalysts are described and taught in U.S. Pat. No. 5,565,521. Suspension, solution, slurry, gas phase, solid-state powder polymerization or other process conditions may be employed if desired. A support, such as silica, alumina, or a polymer (such as polytetrafluoroethylene or a polyolefin) may also be employed if desired.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The chlorinated polyolefin and elastomeric ethylene copolymers of the invention are in the form of particulate solids ranging in size from powders to chips. Powders are typically defined as particulate solids with an average particle size of less than 2000 microns. Pellets are particulate solids generally, but not exclusively, formed through extrusion and pelletization processes, with a typical average particle size greater than 2 mm, typically 2–4 mm. Micropellets typically have an average particle size less than of a standard pellet yet greater than general commercial die capabilities. The average particle size of micropellets range from 300 microns to 2 mm. The micropellets generally exhibit a semi-spheroidal shape. Chips are larger non-pellet particulate solids with average particle sizes of greater than 2 mm.

The particulate solids of the invention may be made using any known process. For example, Knights teaches processes for making micropellets in *Mastering Micropellets: A Processing Primer*, Plastics Technology, pp 55–57 (1995). Examples of products reported to have been micropelletized include polypropylene, polyethylene, polystyrene, polyvinyl chloride, and polycarbonates. A system to generate micropellets for rotomolding applications is taught by Cockbain et al. in PCT Application WO 00/35646. Cockbain used a single-screw Davis Standard extruder to pump polyolefin elastomer through a Gala pelletization system equipped with a die having 0.020" diameter holes.

Blends of the particulate solids of the invention may be made using any known solid mixing or blending process. For example, in "Mixing of Powders", *Handbook of Powder Science and Technology—Second Edition*, Chapman and Hall, pp 568–585 (1997), Kaye mentioned a tumble mixer as a low shear method to generate a bulk mixture. One skilled in the mixing arts could use alternate mixing techniques, such as higher shear equipment described by Kaye, to potentially improve the uniformity of blend dispersion.

The relative ease of flowability for the particulate solids in the Examples was determined by compacting the test specimens and then measuring the unconfined yield strength. This general methodology was developed by Williams et al. in *The Direct Measurement of the Failure Function of a Cohesive Powder*, Powder Technology, Vol. 4, pp 328–337 (1970–1971). The use of a compaction cell to measure unconfined yield strength of ethylene vinyl acetate compacted under conditions to simulate actual handling temperatures and pressures was taught by Griend et al. in *Bulk Flow of Ethylene-Vinyl Acetate Copolymers*, Adhesives Age, pp 14–24 (1998). Testing loads for the Examples were selected to simulate the consolidation stresses that exemplify typical storage units.

EXAMPLES

Tables 1 and 2 describe the chlorinated olefin polymers and elastomeric ethylene copolymers used in the Examples.

TABLE 1

| Physical Properties | Chlorinated Polyethylene | | | | | | |
|---|---|---|---|---|---|---|---|
| | CPE-1 | CPE-2 | CPE-3 | CPE-4 | CPE-5 | CPE-6 | CPE-7 |
| Total Percent Chlorine[1] | 36 | 36 | 35 | 25 | 42 | 36 | 25 |
| Residual Crystallinity[2] | <0.2 | <0.2 | <0.5 | <0.2 | <0.4 | 3 | 8 |
| Melt Viscosity[3] | 27000 | 24000 | — | 26000 | 10000 | 18000 | 14000 |
| Total Antiblock[4] | 7 | 6 | <4 | 6 | 6 | 8 | 5 |
| Physical Form | powder | powder | powder | powder | powder | powder | powder |

[1]Nominal chlorine weight percent can be determined by Schoniger analysis.
[2]Total residual high density polyethylene crystallinity in calories/gram can be determined by differential scanning calorimetry.
[3]Melt viscosity in poise can be determined by capillary rheology for 145 sec$^{-1}$ and 190° C.
[4]Total antiblock is weight percent sum of talc (measured by ash content), calcium stearate (measured by infra-red analyses), or calcium carbonate (measured by infra-red analyses) in the finished product.

TABLE 2

| | Polyolefin Elastomer | | | |
|---|---|---|---|---|
| Physical Properties | POE-1 | POE-2 | POE-3 | POE-4 |
| Polymer Density[1] | 0.875 | 0.868 | 0.870 | 0.880 |
| Polymer Melt Index[2] | 3.0 | 0.5 | 5.0 | 18 |
| Physical Form | micropellet | micropellet | micropellet | pellet |

[1]Polymer density in g/cc measured according to ASTM D-792.
[2]Polymer I$_2$ melt index in grams/10 minutes measured at 190° C. according to ASTM D-1238.

A blend composition of the invention was prepared by tumble blending 10.0–11.1 lbs. of the materials for 15–20 minutes in five gallon buckets mounted on a Plastic Process Equipment Model DTC0513 blender.

The anti-massing behavior was determined by a specific blocking test. The specific blocking test was performed using the following procedure to measure the strength of pellet mass that has been consolidated at a known stress level and temperature for a pre-determined duration. A 2" diameter cylinder made up of two halves held together by a hose clamp was used. The internal surface of the cylinder was coated with calcium stearate. Excess calcium stearate dust was removed using an airbrush. Typically, a 60–150 gram sample of the blend composition was poured into the cylinder. The side walls of the cylinder were tapped gently during loading to settle the solids. A 2" Teflon® circular sheet was placed on top of the solids in the cylinder to prevent sticking to the weight load. Test loads, temperature, and test duration were set to simulate relatively harsh transportation or storage conditions. A weight load was placed on the sheet and the cylinder was placed in an oven at 37° C. for a prescribed interval. A 6 lb. load was used to simulate 275 lbf/ft$^2$ pressure and a 4.25 lb. load was used to simulate 195 lbf/ft$^2$ pressure. The load was then removed and the cylinder was allowed to cool at ambient conditions (20° C.) for at least 12 hours. The blend sample was then removed from the cylinder. The unconfined yield strength was measured using an Instron. The procedure was repeated to measure the unconfined yield strength at different intervals approaching 90 days.

The weight-proportioned linear interpolation can be defined by the equation:

$$B = \Sigma w_f b$$

where B=projected blend unconfined yield strength (UYS), $w_f$=weight fraction of component in blend, and b=measured UYS of the corresponding component. For situations where the blend measured UYS is less than that of either individual component, the measured blend UYS must be less than the projected weight-proportioned UYS.

Comparative Example 1

Referring to FIG. 1, the blocking test procedure was performed on samples of 100% CPE-1, 100% CPE-2 and 100% POE-1. The test was conducted at 37° C. and 195 lbf/ft2 pressure. The base line results are summarized in FIG. 1 (Yield Strength Over Time). The samples exhibit varying unconfined yield strengths with a noticeable rate of increase in yield strength over time, which indicates a greater propensity to block over time.

Example 1

Figure 2:
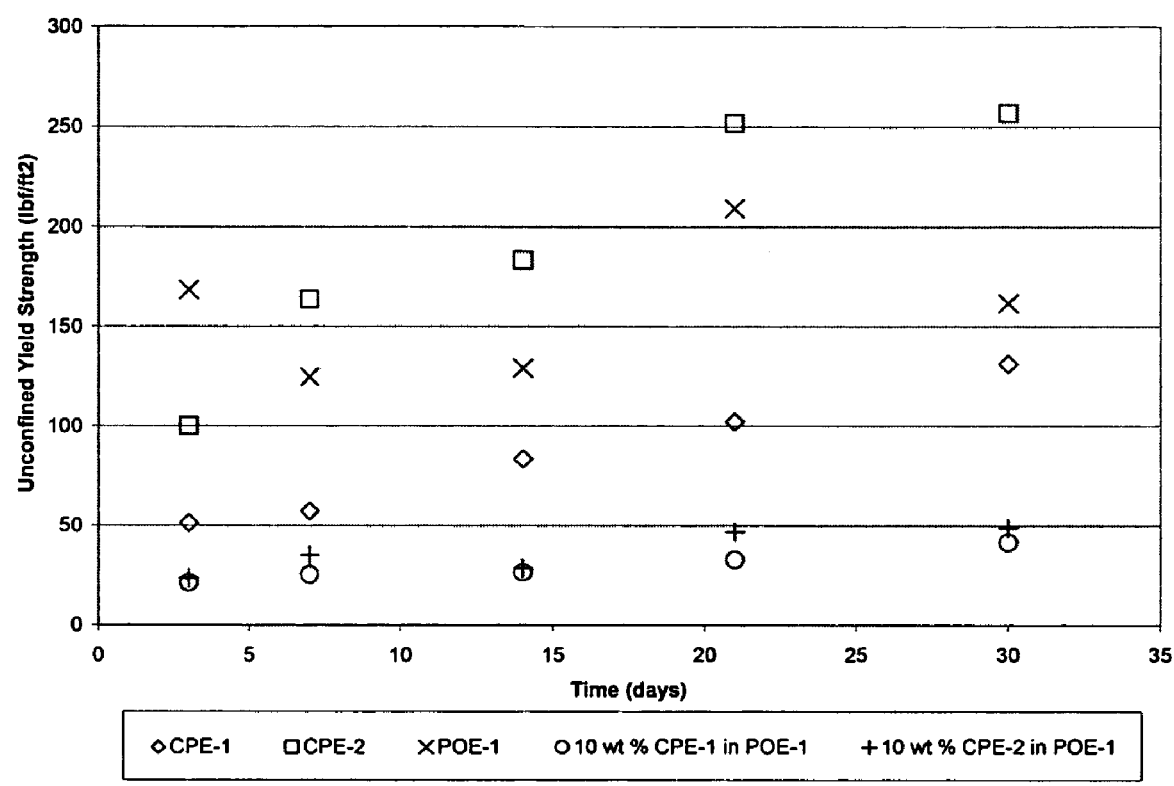
FIG. 2 illustrates the unconfined yield strength of individual components of the inventive blend and different embodiments of the inventive blend as a function of time.

Referring to FIG. 2, POE-1 was blended with CPE to a concentration of 10.0 wt % CPE-2 and to 10.0 wt % CPE-1. The blocking tests were conducted at 37° C. and 195 lbf/ft$^2$ pressure. The results are shown in FIG. 2 with the baseline results of Comparative Example 1. The examples of the invention demonstrate a greatly reduced unconfined yield strength over time and therefore improved anti-blocking characteristics relative to the individual components that comprise the comparative baseline samples.

Comparative Example 2

Figure 3:
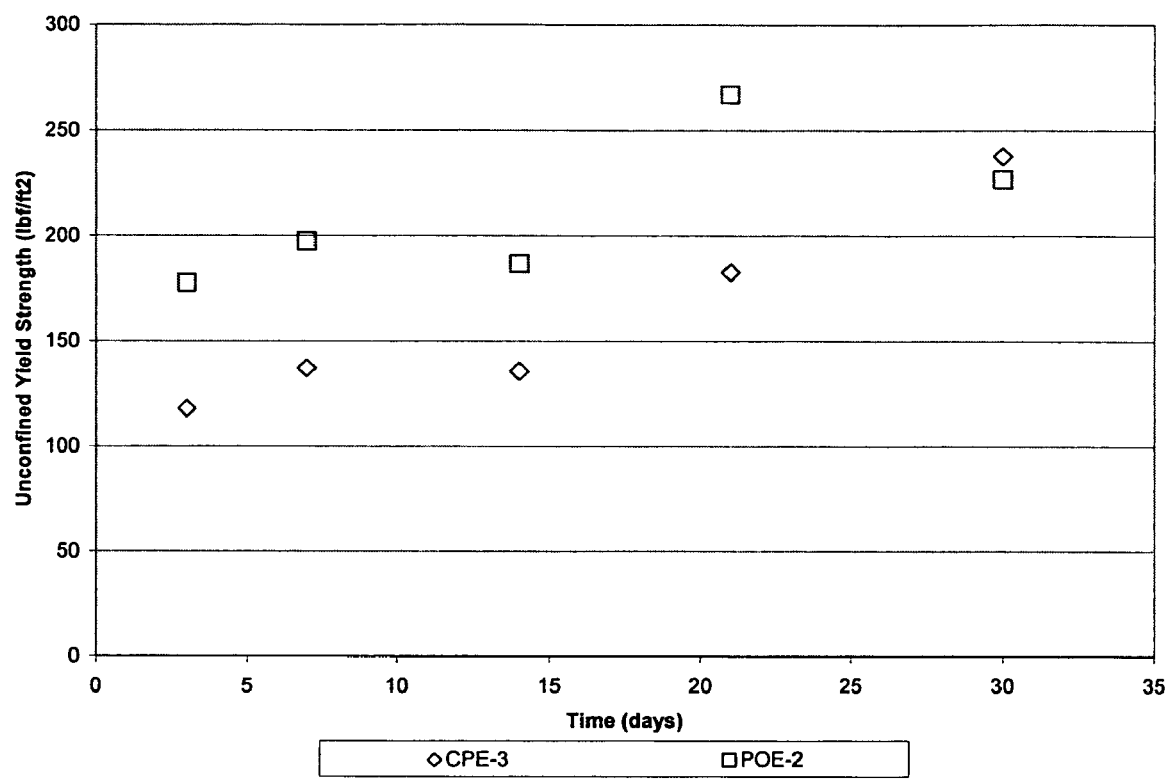
FIG. 3 illustrates the unconfined yield strength of individual components of the inventive blend as a function of time.

Referring to FIG. 3, the blocking test procedure was performed on samples of 100% CPE-3 and 100% POE-2. The test was conducted at 37° C. and 195 lbf/ft$^2$ pressure. The baseline results are summarized in FIG. 3 (Yield Strength Over Time). The samples exhibit varying unconfined yield strengths with a noticeable rate of increase in yield strength over time, which indicates a greater propensity to block over time.

Example 2

Figure 4:
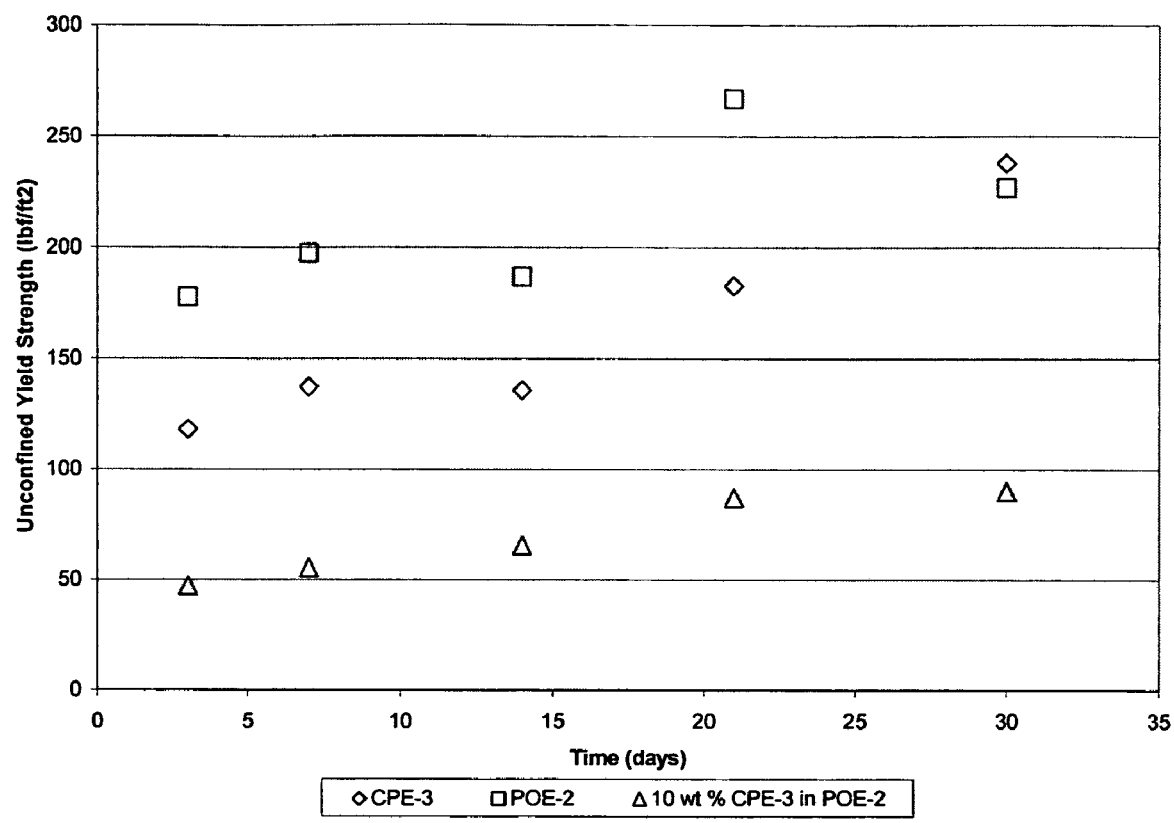
FIG. 4 illustrates the unconfined yield strength of individual components of the inventive blend and the inventive blend as a function of time.

Referring to FIG. 4, POE-2 was blended with CPE to a concentration of 10.0 wt % CPE3. The blocking test was conducted at 37° C. and 195 lbf/ft² pressure. The results are shown FIG. 4 with the original baseline results of Comparative Example 2. The example of the invention demonstrates a greatly reduced unconfined yield strength over time and therefore improved anti-blocking characteristics over the individual components that comprise the comparative baseline examples.

Comparative Example 3

Figure 5:
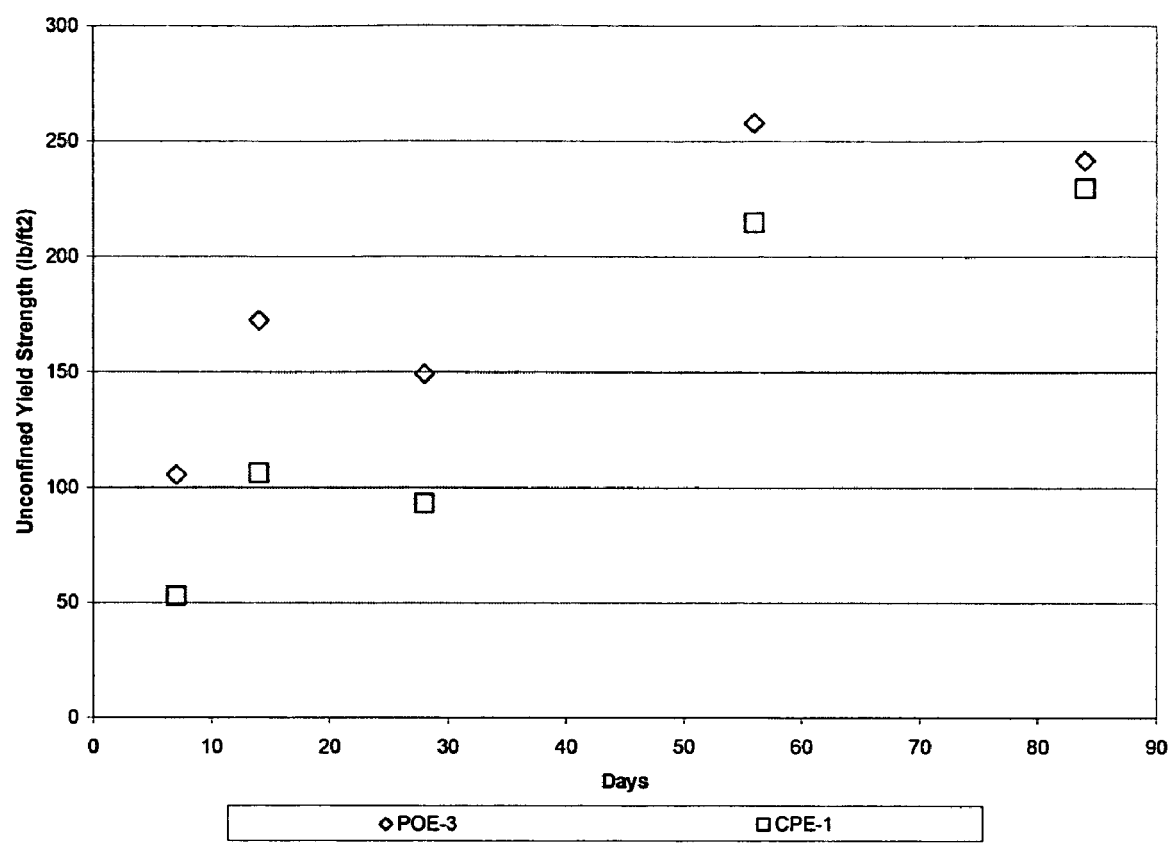
FIG. 5 illustrates the unconfined yield strength of individual components of the inventive blend as a function of time.

Referring to FIG. 5, the blocking test procedure was performed on samples of 100% CPE-1 and 100% POE-3. The test was conducted at 37° C. and 195 lbf/ft² pressure. The baseline results are summarized in FIG. 5 (Yield Strength Over Time). The samples exhibit varying unconfined yield strengths with a noticeable increase in yield strength over time, which indicates a greater propensity to block over time.

Example 3

Figure 6:
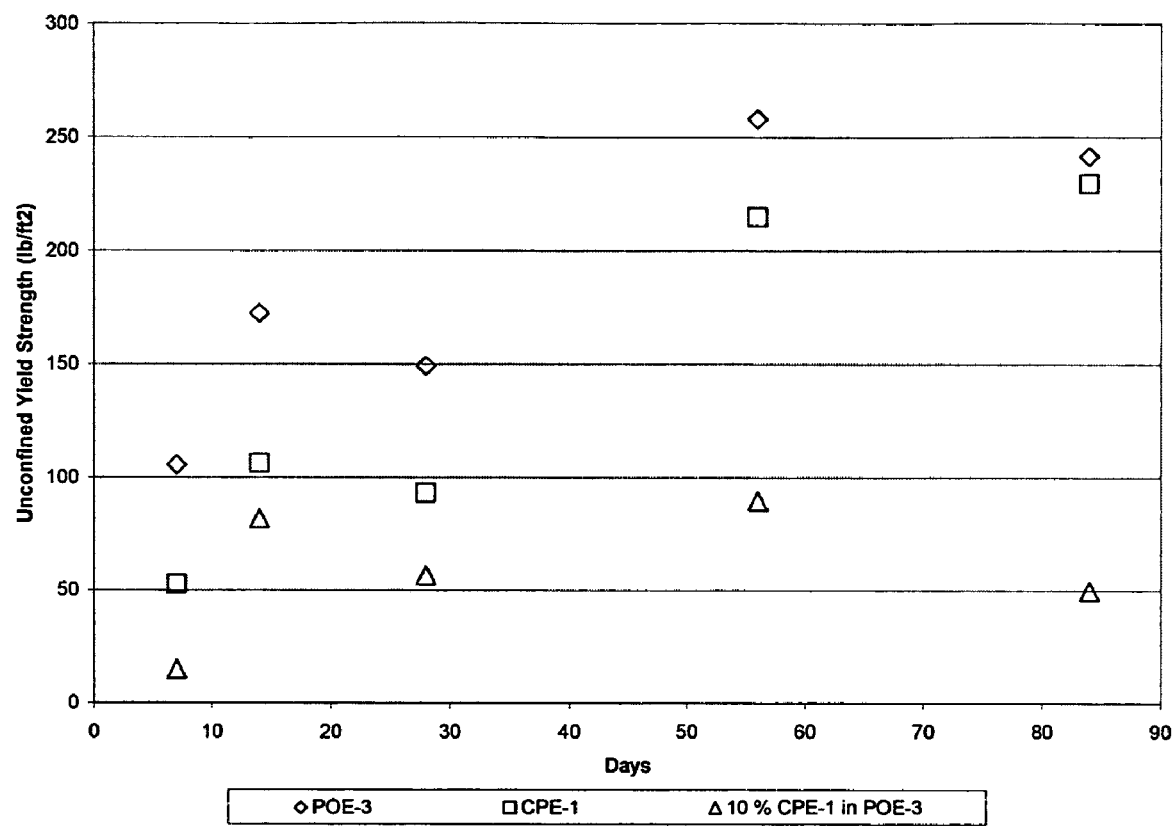
FIG. 6 illustrates the unconfined yield strength of individual components of the inventive blend and the inventive blend as a function of time.

Referring to FIG. 6, POE-3 was blended with CPE to a concentration of 10.0 wt % CPE-1. The blocking test was conducted at 37° C. and 195 lbf/ft² pressure. The results are shown in FIG. 6 with the original baseline results of Comparative Example 3. The example of the invention demonstrates a greatly reduced unconfined yield strength over an extended time and therefore improved anti-blocking characteristics over the individual components that comprise the comparative baseline examples.

Comparative Example 4

Figure 7:
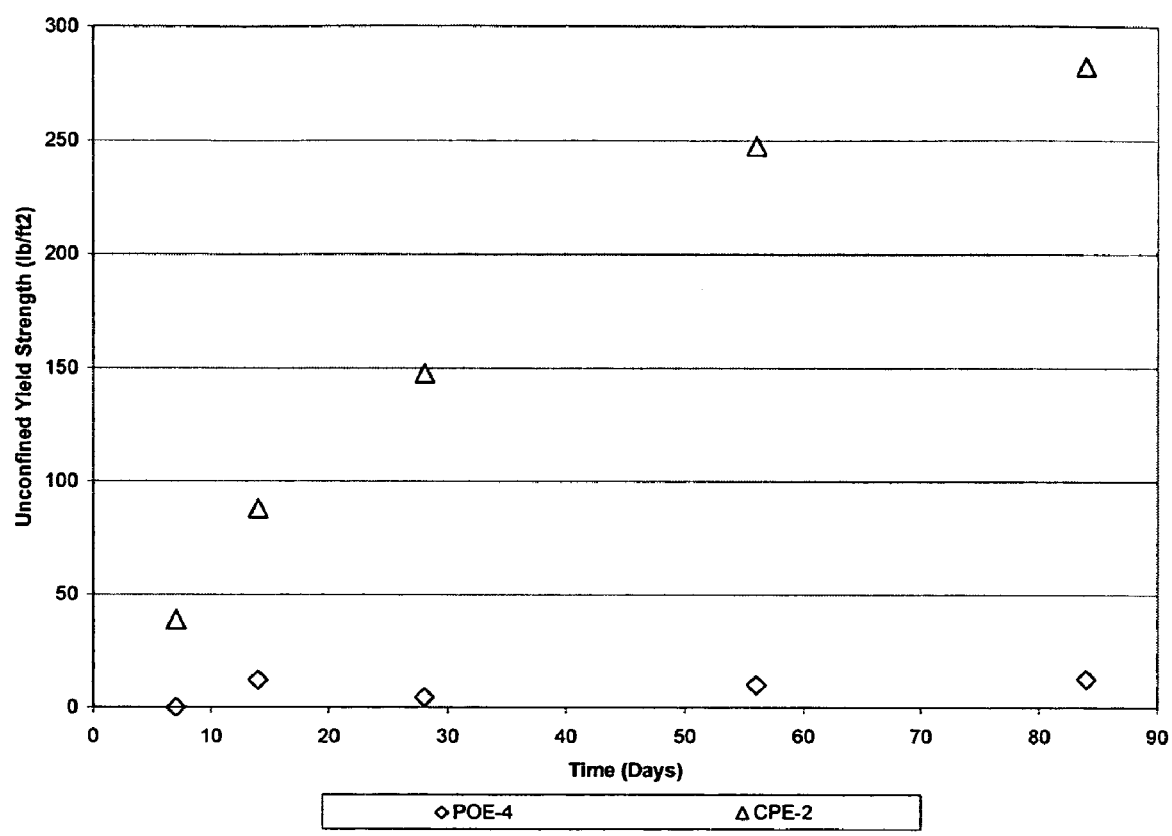
FIG. 7 illustrates the unconfined yield strength of individual components of the inventive blend as a function of time.

Referring to FIG. 7, the blocking test procedure was performed on 100% CPE-2 and 100% POE-4. The test was conducted at 37 C and 195 lbf/ft² pressure. The baseline results are summarized in FIG. 7 (Yield Strength Over Time). The samples exhibit varying unconfined yield strength with a noticeable increase in yield strength over time, which indicates a greater propensity to block over time.

Example 4

Figure 8:
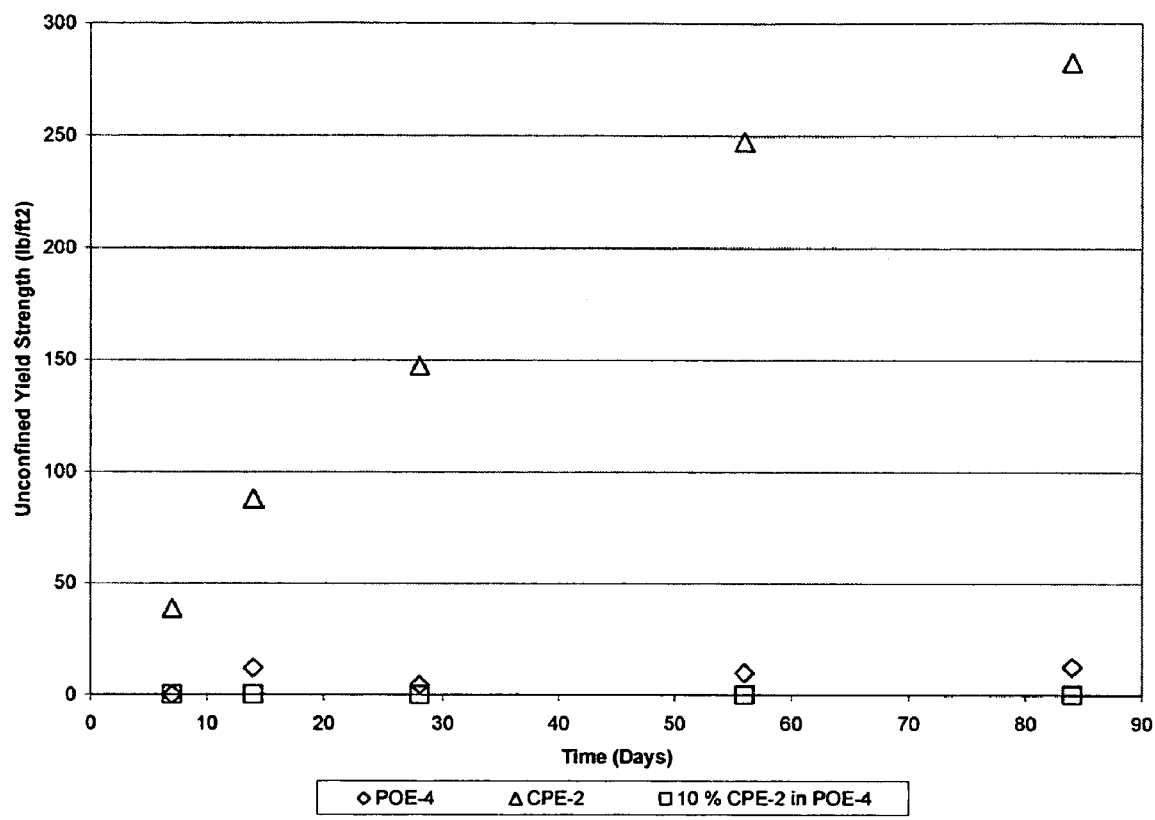
FIG. 8 illustrates the unconfined yield strength of individual components of the inventive blend and the inventive blend as a function of time.

Referring to FIG. 8, POE-4 was blended with CPE to a concentration of 10.0 wt % CPE-2. The blocking test was conducted at 37° C. and 195 lbf/ft² pressure. The results are shown in FIG. 8 with the original baseline results of Comparative Example 4. The example of the invention demonstrates a significantly reduced unconfined yield strength over an extended period of time and therefore improved anti-blocking characteristics over the individual components that comprise the comparative baseline examples. In fact, the blocking characteristics of the blended material were too low to measure.

Comparative Example 5

Figure 9:
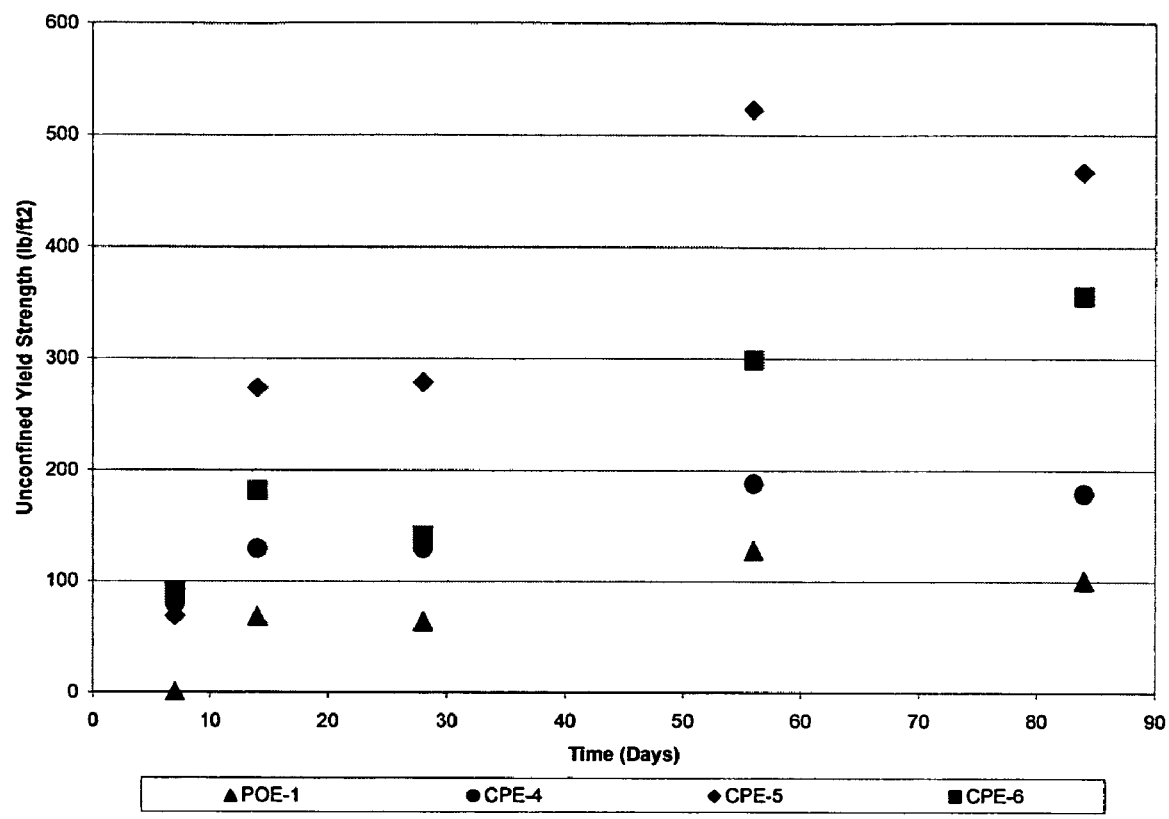
FIG. 9 illustrates the unconfined yield strength of individual components of the inventive blend as a function of time.

Referring to FIG. 9, the blocking test procedure was performed on 100% CPE-4, 100% CPE-5, 100% CPE-6 and 100% POE1. The test was conducted at 37° C. and 195 lbf/ft² pressure. The baseline results are summarized in FIG. 9 (Unconfined Yield Strength Over Time). The results exhibit varying unconfined yield strengths with a noticeable increase in yield strength over time, which indicates a greater propensity to block over time.

Example 5

Figure 10:
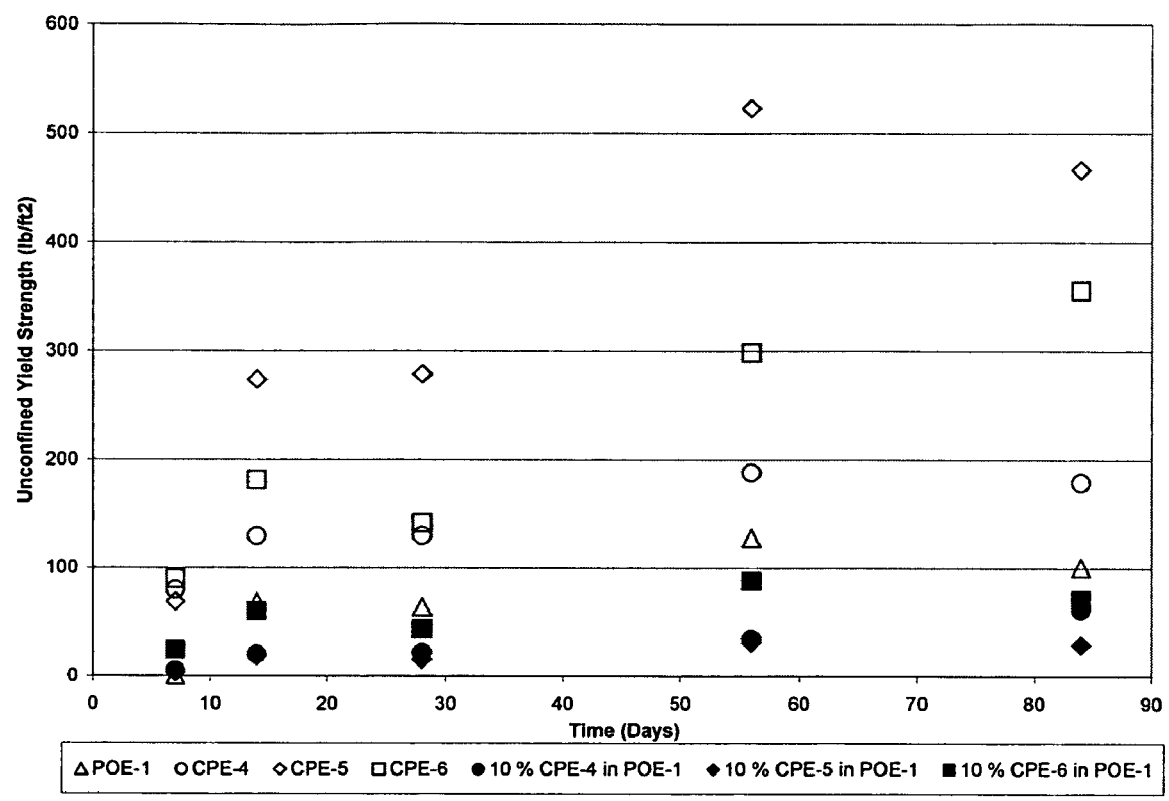
FIG. 10 illustrates the unconfined yield strength of individual components of the inventive blend and different embodiments of the inventive blend as a function of time.

Referring to FIG. 10, POE-1 was blended with CPE to a concentration of 10 wt % CPE-4, 10 wt % CPE-5, and to 10 wt % CPE-6. The blocking tests were conducted at 37° C. and 195 lbf/ft² pressure. The results are shown in FIG. 10 with the baseline samples of Comparative Example 5. The examples of the invention demonstrate greatly reduced unconfined yield strength over an extended time and therefore improved antiblocking characteristics relative to the individual components that comprise the comparative baseline samples.

Example 6

Figure 11:
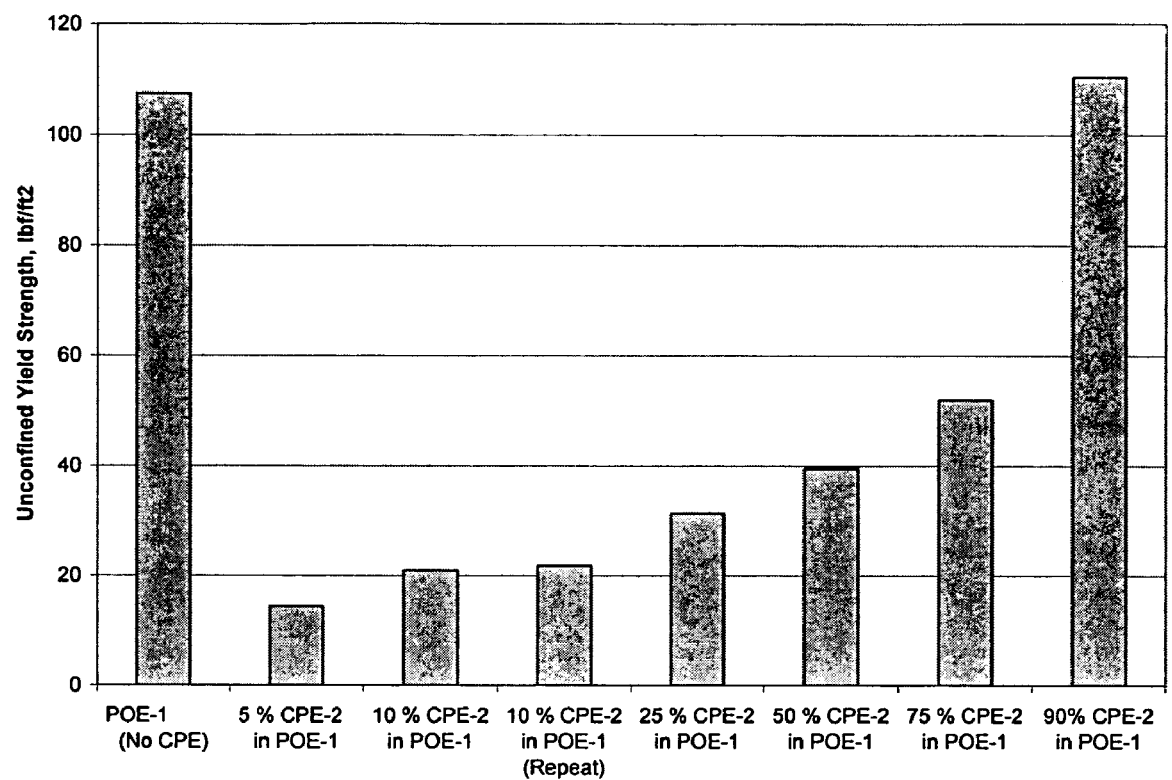
FIG. 11 illustrates a comparison of the unconfined yield strength of individual components of the inventive blend and different embodiments of the inventive blend.

Referring to FIG. 11, Varying levels of CPE-2 were blended with POE-1 to determine the chlorinated polyethylene concentration effect on blend blocking behavior. The blocking test conditions were set at 7 days at 37° C. under 275 lbf/ft² pressure. The results indicate reduced unconfined yield strength for CPE concentrations greater than zero and less than 90%, with an optimum value being near 5 wt % CPE. The results are summarized in FIG. 11.

Example 7

Figure 12:
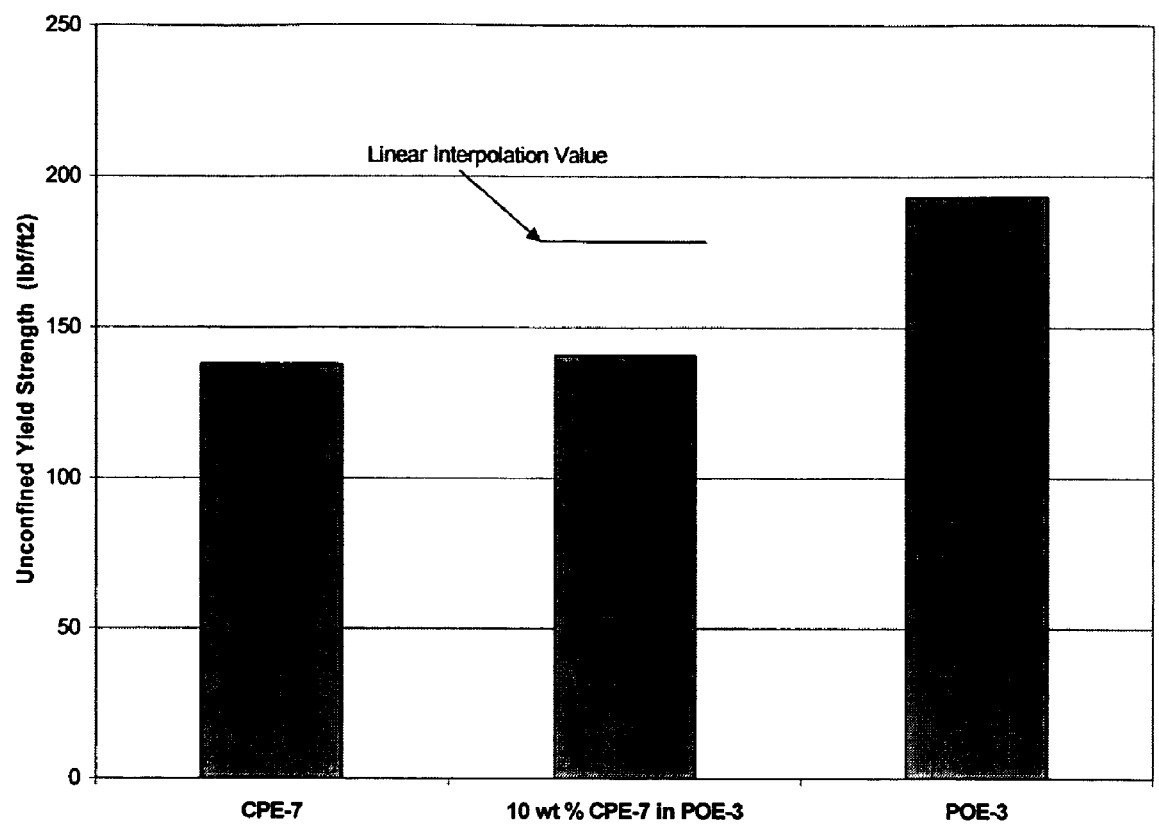
FIG. 12 illustrates a comparison of the unconfined yield strength of individual components of the inventive blend and the inventive blend.

Referring to FIG. 12, the blocking test procedure was performed on 100% CPE-7, 100% POE-3, and a blend of 10 wt % CPE-7 in POE-3. The test was conducted at 37° C. and 195 lbf/ft² pressure for 22 days. The measured unconfined yield strengths are summarized in FIG. 12. For the blend composition of 10 wt. % CPE-7 (UYS=138 lb/ft2) and 90 wt. % POE-3 (UYS=193 lb/ft2), the projected blend unconfined yield strength based on a proportional weight-based interpolation on individual components is 187 lb/ft2. The results show that addition of CPE-7 improved the blocking performance of the blend more than would be expected by a weight-based linear interpolation.

Example 8

Figure 13:
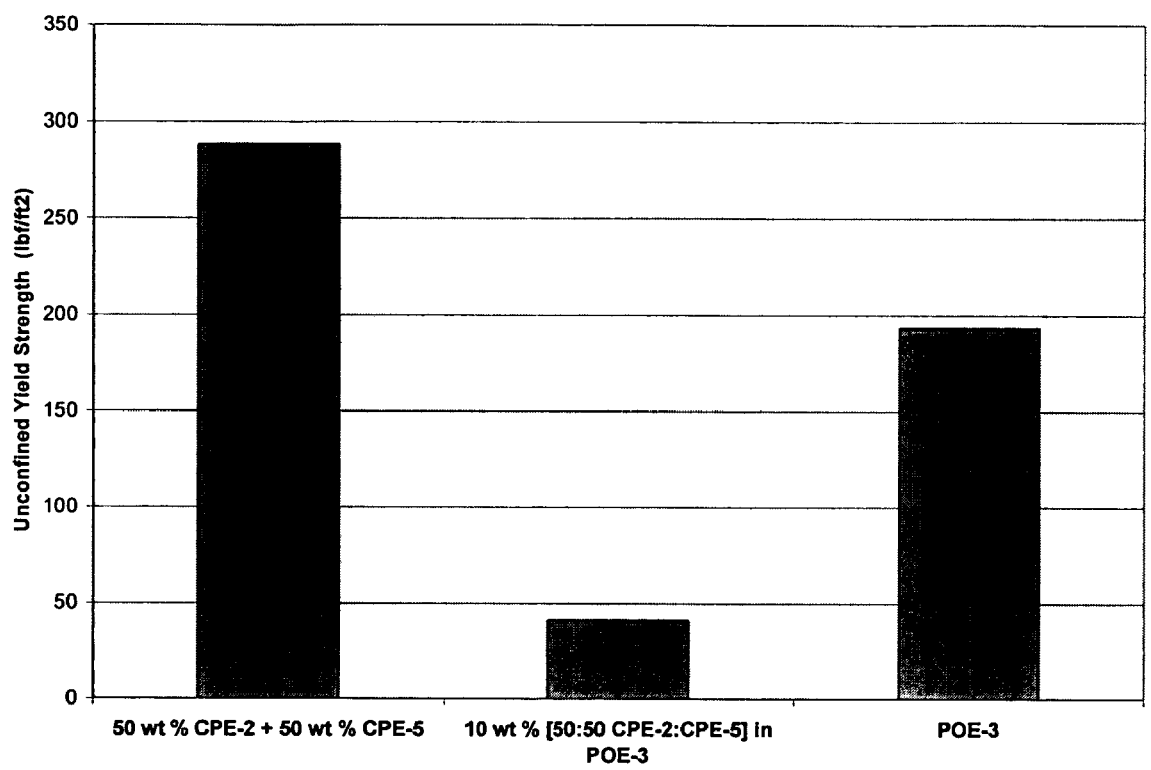
FIG. 13 illustrates a comparison of the unconfined yield strength of individual components of the inventive blend and different embodiments of the inventive blend.

Referring to FIG. 13, to demonstrate the potential for using composite blends, a blend of 50 wt % CPE-2 and 50 wt % CPE-5 was generated. The blocking test procedure was performed on 50:50 CPE-2:CPE5 mixture, 100% POE-3, and a blend of 10 wt % [50:50 CPE-2:CPE-5] in POE-3. The test was conducted at 37° C. and 195 lbf/ft² pressure for 22 days. The measured unconfined yield strenghts are summarized in FIG. 13. The results show that multi-component blends can also be employed to improve the overall blend blocking performance.

What is claimed is:

1. A physical blend of particulates comprising:
   a first component, wherein said first component being a chlorinated polyethylene, and said first component being in a powder form, micropellet form, or pellet form; and
   a second component, wherein said second component being an elstomeric ethylene copolymer, and said second component being in a powder form, micropellet form, or pellet form;

wherein said blend having a measured Unconfined Yield Strength of less than the measured Unconfined Yield Strength of either said first component or said second component.

2. The blend according to claim 1, wherein said blend further comprising an anti-blocking agent.

3. The blend according to claim 1, wherein said blend comprising from about 1 to about 60 percent by weight of said first component based on the total weight of said blend.

4. The blend according to claim 2, wherein said first component comprising from about less than 10 percent by weight of said anti-blocking agent.

5. The blend according to claim 1, wherein said elseomeric polyethylene copolymer being an ethylene/alpha-olefin copolymer.

6. The blend according to claim 1, wherein said first component being in a powder form.

7. The blend according to claim 1, wherein said second component being in a micropellet form.

8. A physical blend of particulates consisting essentially of:
   a first component, wherein said first component being a chlorinated polyethylene, and said first component being in a powder form, micropellet form, or pellet form; and
   a second component, wherein said second component being an elstomeric ethylene copolymer, and said second component being in a powder form, micropellet form, or pellet form;
   wherein said blend having a measured Unconfined Yield Strength of less than the measured Unconfined Yield Strength of either said first component or said second component.

9. The blend according to claim 8, wherein said blend further including an antiblocking agent.

10. The blend according to claim 8, wherein said blend comprising from about 1 to about 60 percent by weight of said first component based on the total weight of said blend.

11. The blend according to claim 8, wherein said elstomeric polyethylene copolymer being an ethylene/alpha-olefin copolymer.

12. The blend according to claim 8, wherein said first component being in a powder form.

13. The blend according to claim 8, wherein said second component being in a micropellet form.

* * * * *